US012745092B2

(12) United States Patent
Nakata

(10) Patent No.: US 12,745,092 B2
(45) Date of Patent: Sep. 22, 2026

(54) BASE STATION DEVICE, RELAY STATION DEVICE, COMMUNICATION CONTROL METHODS, AND COMMUNICATION CONTROL PROGRAM PRODUCTS

(71) Applicant: DENSO CORPORATION, Kariya-city (JP)

(72) Inventor: Tsuneo Nakata, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 390 days.

(21) Appl. No.: 18/310,165

(22) Filed: May 1, 2023

(65) Prior Publication Data

US 2023/0269594 A1 Aug. 24, 2023

Related U.S. Application Data

(63) Continuation of application No. PCT/JP2021/029868, filed on Aug. 16, 2021.

(30) Foreign Application Priority Data

Nov. 9, 2020 (JP) ................................ 2020-186693

(51) Int. Cl.
*H04W 16/10* (2009.01)
*H04W 16/26* (2009.01)

(52) U.S. Cl.
CPC ........... *H04W 16/10* (2013.01); *H04W 16/26* (2013.01)

(58) Field of Classification Search
CPC ..... H04W 16/10; H04W 16/26; H04W 88/08; H04W 4/33; H04W 4/44; H04W 72/04;
(Continued)

(56) References Cited

U.S. PATENT DOCUMENTS

2007/0218951 A1* 9/2007 Risheq ................. H04B 7/2606 455/562.1
2009/0225706 A1* 9/2009 Ramachandran .... H04B 7/2606 370/329
(Continued)

FOREIGN PATENT DOCUMENTS

JP 2015534782 A 12/2015
RU 2454813 C2 * 6/2012 ........... H04B 7/2606
(Continued)

OTHER PUBLICATIONS

Yu et al., IEEE C802.16j-08/106r4, Project: IEEE 802.16 Broadband Wireless Access Working Group, Title: Proposal for Full Duplex Relay, Date Submitted: May 15, 2008.

*Primary Examiner* — Umair Ahsan
(74) *Attorney, Agent, or Firm* — Harness, Dickey & Pierce, P.L.C.

(57) ABSTRACT

A base station device communicates with a communication terminal device via a relay station device, which is located in a shielded space and performs a downstream communication with the communication terminal device located in the shielded space concurrently with an upstream communication with the base station device. The base station device includes: resource allocation unit allocating resources to be used in a communication between the relay station device and the base station device; a reuse requirement storage storing a reuse requirement, which is set based on a radio wave shielding ability of the shielded space; a reuse resource specifying unit specifying one or more reuse resources that satisfy the reuse requirement from the resources allocated by the resource allocation unit; and a transmission instruction unit instructing transmission of the reuse resources to the relay station device.

11 Claims, 11 Drawing Sheets

(58) Field of Classification Search
CPC . H04W 72/50; H04B 7/15507; H04B 7/2606; H04B 7/15542
See application file for complete search history.

(56) References Cited

U.S. PATENT DOCUMENTS

2010/0118996 A1* 5/2010 Sundaresan ........... H04W 72/04 375/260
2011/0069655 A1* 3/2011 Ikeda ..................... H04B 7/155 370/315
2012/0307715 A1* 12/2012 Maeda .................. H04L 5/0053 370/315
2014/0099881 A1* 4/2014 Boudreau ............. H04W 16/28 455/7
2015/0215903 A1* 7/2015 Zhao ..................... H04W 72/04 370/329
2015/0311967 A1* 10/2015 Boudreau ............. H04W 16/28 455/7
2018/0041324 A1 2/2018 Maeda et al.
2020/0373998 A1* 11/2020 Nordlöw ............... H04W 72/04

FOREIGN PATENT DOCUMENTS

WO WO-2009/145013 A1 12/2009
WO WO-2011099508 A1 8/2011
WO WO-2019103668 A1 5/2019

* cited by examiner

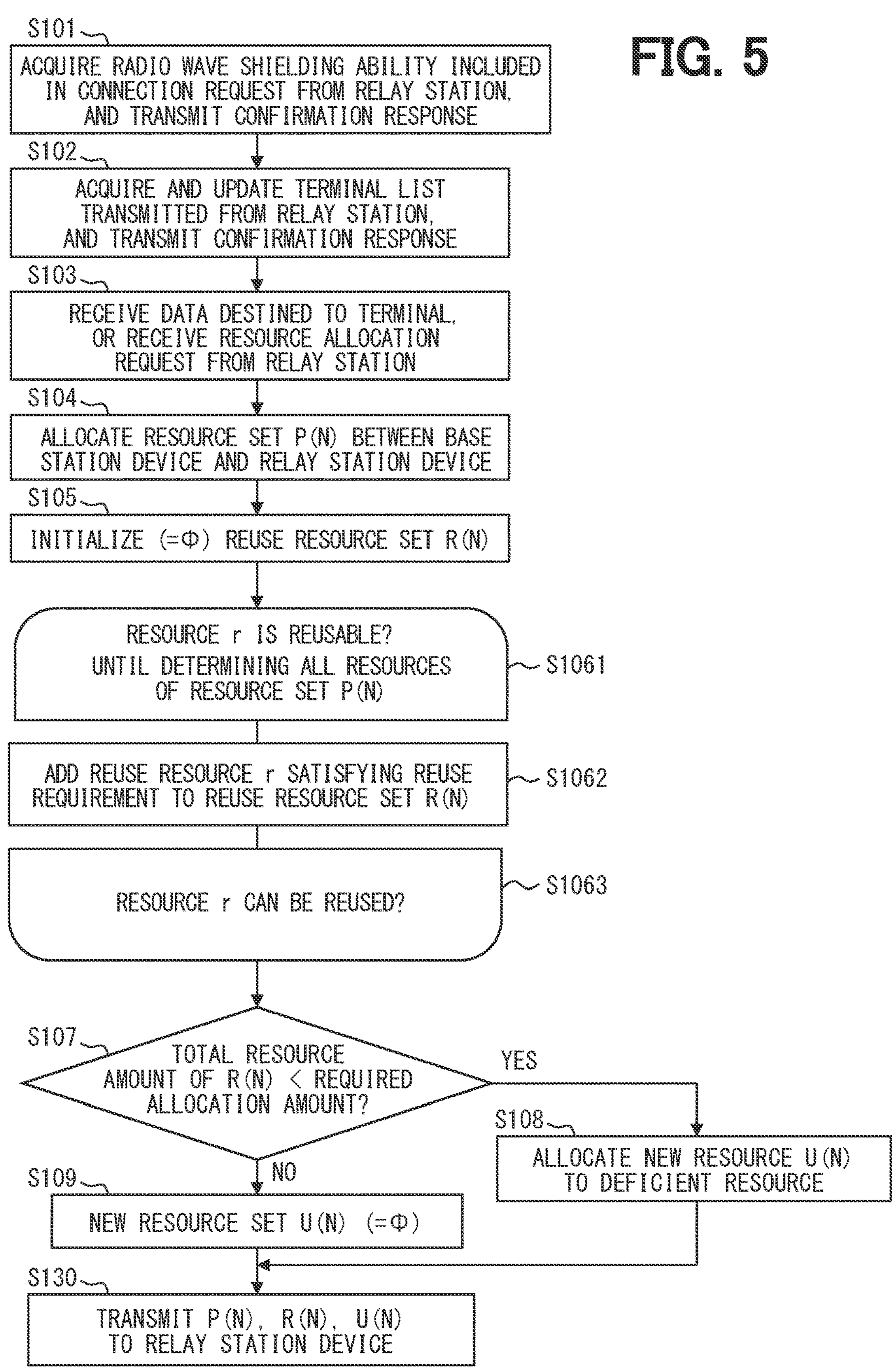
FIG. 5
S101
ACQUIRE RADIO WAVE SHIELDING ABILITY INCLUDED IN CONNECTION REQUEST FROM RELAY STATION, AND TRANSMIT CONFIRMATION RESPONSE
S102
ACQUIRE AND UPDATE TERMINAL LIST TRANSMITTED FROM RELAY STATION, AND TRANSMIT CONFIRMATION RESPONSE
S103
RECEIVE DATA DESTINED TO TERMINAL, OR RECEIVE RESOURCE ALLOCATION REQUEST FROM RELAY STATION
S104
ALLOCATE RESOURCE SET P(N) BETWEEN BASE STATION DEVICE AND RELAY STATION DEVICE
S105
INITIALIZE (=Φ) REUSE RESOURCE SET R(N)
RESOURCE r IS REUSABLE? UNTIL DETERMINING ALL RESOURCES OF RESOURCE SET P(N)
S1061
ADD REUSE RESOURCE r SATISFYING REUSE REQUIREMENT TO REUSE RESOURCE SET R(N)
S1062
RESOURCE r CAN BE REUSED?
S1063
S107
TOTAL RESOURCE AMOUNT OF R(N) < REQUIRED ALLOCATION AMOUNT?
YES
S108
ALLOCATE NEW RESOURCE U(N) TO DEFICIENT RESOURCE
NO
S109
NEW RESOURCE SET U(N) (=Φ)
S130
TRANSMIT P(N), R(N), U(N) TO RELAY STATION DEVICE

FIG. 8

| STRUCTURE TYPE OF SHIELDED SPACE ACCOMMODATING COMMUNICATION (T) USING REUSE RESOURCE<br>SHIELDED SPACE · SHIELDING ABILITY | | COMMUNICATION (R) WITH ALLOCATED COMMUNICATION RESOURCE | | |
|---|---|---|---|---|
| | | R1 SUBJECT RELAY STATION AND BASE STATION | R2 BASE STATION AND ANOTHER RELAY STATION | R3 ANOTHER RELAY STATION AND TERMINAL ACCOMMODATED THEREIN |
| T1 VEHICLE · ATTENUATION DISTANCE D D<a | DOWNLINK | AVAILABLE | AVAILABLE | DISTANCE L TO RELAY STATION<br>AVAILABLE WHEN L>Max(a)<br>UNAVAILABLE WHEN L≤Max(a) |
| | UPLINK | AVAILABLE | DISTANCE L TO RELAY STATION<br>AVAILABLE WHEN L>Xa<br>UNAVAILABLE WHEN L≤Xa | DISTANCE L TO RELAY STATION<br>AVAILABLE WHEN L>Max(a)<br>UNAVAILABLE WHEN L≤Max(a) |
| T2 VEHICLE · ATTENUATION DISTANCE D a≤D<b | DOWNLINK | UNAVAILABLE | UNAVAILABLE | DISTANCE L TO RELAY STATION<br>AVAILABLE WHEN L>Max(b)<br>UNAVAILABLE WHEN L≤Max(b) |
| | UPLINK | UNAVAILABLE | DISTANCE L TO RELAY STATION<br>AVAILABLE WHEN L>Xb<br>UNAVAILABLE WHEN L≤Xb | DISTANCE L TO RELAY STATION<br>AVAILABLE WHEN L>Max(b)<br>UNAVAILABLE WHEN L≤Max(b) |
| T3 BUILDING · ATTENUATION DISTANCE D D<c | DOWNLINK | AVAILABLE | AVAILABLE | AVAILABLE |
| | UPLINK | AVAILABLE | DISTANCE L TO RELAY STATION<br>AVAILABLE WHEN L>Xc<br>UNAVAILABLE WHEN L≤Xc | AVAILABLE |

1
21
2
R1
REUSE
D < c : AVAILABLE
D ≥ c : UNAVAILABLE
20
22
T3
23

BASE STATION DEVICE, RELAY STATION DEVICE, COMMUNICATION CONTROL METHODS, AND COMMUNICATION CONTROL PROGRAM PRODUCTS

CROSS REFERENCE TO RELATED APPLICATIONS

The present application is a continuation application of International Patent Application No. PCT/JP2021/029868 filed on Aug. 16, 2021, which designated the U.S. and claims the benefit of priority from Japanese Patent Application No. 2020-186693 filed on Nov. 9, 2020. The entire disclosures of all of the above applications are incorporated herein by reference.

TECHNICAL FIELD

The present disclosure relates to a base station device and a relay station device, which perform efficient data transmission and data reception by reusing allocated communication resources in a communication with a communication terminal device through the relay station device.

BACKGROUND

With the spread of wireless communication, chances using wireless communications in various places are increasing. In a moving object such as an automobile, technology of performing driving support and automated driving control using V2X, such as large-capacity cellular communication, vehicle-to-vehicle communication, and road-to-vehicle communication has attracted attention. Accordingly, efficient use of communication resources is required in order to improve frequency use efficiency. For example, an application of piecewise frequency reuse and power defense-protected beamforming to mitigate interference introduced by mobile relay nodes in heterogeneous networks is known.

SUMMARY

The present disclosure provides a base station device, which communicates with a communication terminal device via a relay station device. The relay station device is located in a shielded space and performs a downstream communication with the communication terminal device located in the shielded space concurrently with an upstream communication with the base station device. The base station device is configured to: allocate one or more resources to be used in a communication between the relay station device and the base station device; specify, from the allocated one or more resources, one or more reuse resources that are reusable for a communication between the relay station device and the communication terminal device based on a reuse requirement, the reuse requirement being set with reference to a radio wave shielding ability of the shielded space; and transmit the specified one or more reuse resources from the base station device to the relay station device.

BRIEF DESCRIPTION OF DRAWINGS

Objects, features and advantages of the present disclosure will become apparent from the following detailed description made with reference to the accompanying drawings.

FIG. 5 is a flowchart illustrating a modification operation of the base station device according to the first embodiment of the present disclosure.

FIG. 8 is a diagram illustrating a reuse table as a specific example of reuse requirement.

DETAILED DESCRIPTION

Figure 1:
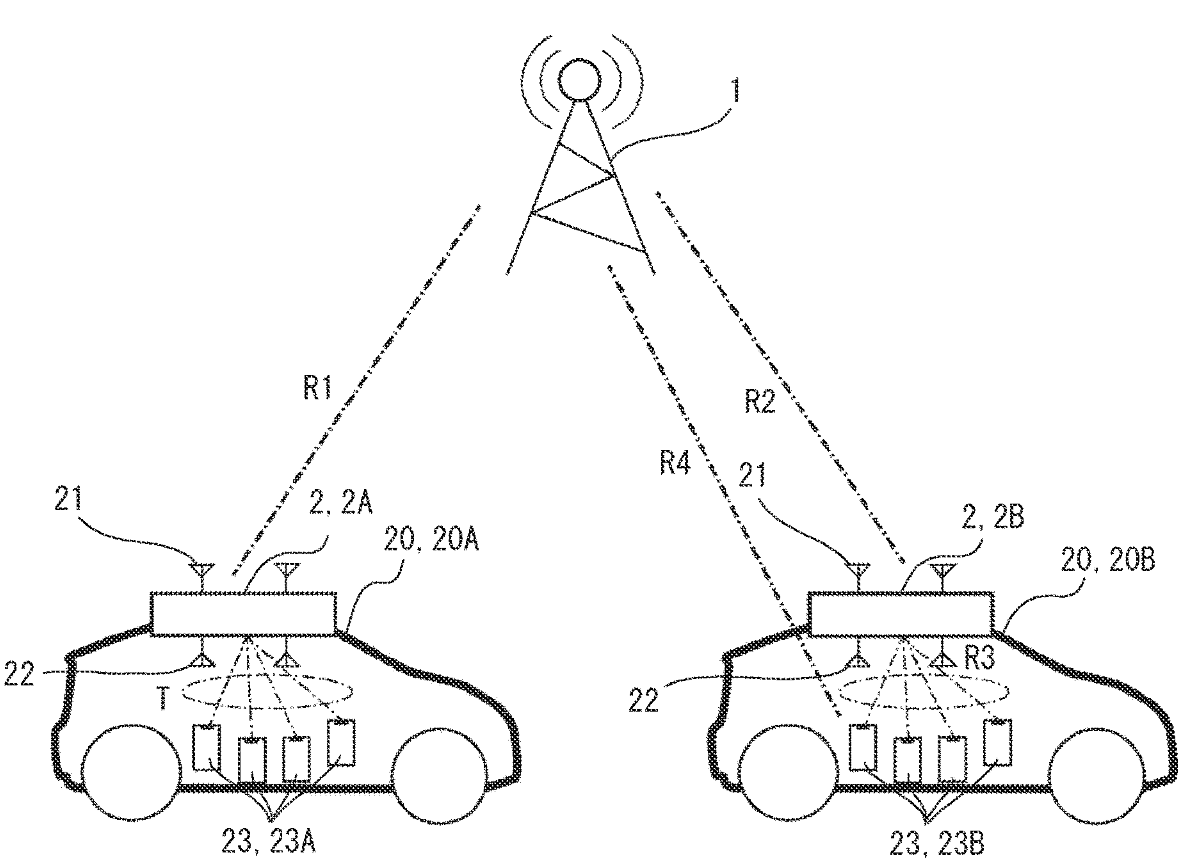
FIG. 1 is a diagram showing an overall configuration according to an embodiment of the present disclosure.

Before describing embodiments of the present disclosure, a study performed by the inventor of the present disclosure will be described. The inventor of the present disclosure found that when a relay node moves, in order to avoid interference at all times, it is necessary to control the beamforming to dynamically follow a movement of the relay node. Under a fading environment, since a coverage of the relay node is not uniform with respect to a distance to a mobile device, it is necessary to share the frequency with a sufficient margin. Thus, it is difficult to increase the reuse efficiency of communication frequency. A communication between a donor macro cell base station BS and the relay node and a communication between the relay node and the mobile device cannot share time and frequency.

According to an aspect of the present disclosure, a base station device communicates with a communication terminal device via a relay station device. The relay station device is located in a shielded space and performs a downstream communication with the communication terminal device located in the shielded space concurrently with an upstream communication with the base station device. The base station device includes: a resource allocation unit allocating one or more resources to be used in a communication between the relay station device and the base station device; a reuse requirement storage storing a reuse requirement, which is set based on a radio wave shielding ability of the shielded space; a reuse resource specifying unit specifying one or more reuse resources that satisfy the reuse requirement from the one or more resources allocated by the resource allocation unit; and a transmission instruction unit instructing transmission of the specified one or more reuse resources to the relay station device.

According to another aspect of the present disclosure, a relay station device, which is located in a shielded space, relays a communication between a communication terminal device and a base station device. The relay station device performs a downstream communication with the communication terminal device located in the shielded space concurrently with an upstream communication with the base station device. The relay station device includes: a relay station information storage storing a radio wave shielding ability of the shielded space; a connection request instruction unit instructing adding of the radio wave shielding ability of the shielded space to a connection request and transmitting of the connection request to the base station device; a reuse resource acquiring unit acquiring one or more reuse resources satisfying a reuse requirement that is set based on the radio wave shielding ability; and a reuse resource allocation unit allocating the one or more reuse resources to a communication between the relay station device and the communication terminal device.

According to another aspect of the present disclosure, a communication control method of a base station device, which communicates with a communication terminal device via a relay station device, is provided. The relay station device is located in a shielded space, and performs a downstream communication with the communication terminal device located in the shielded space concurrently with an upstream communication with the base station device. The communication control method includes: allocating one or more resources to be used in a communication between the relay station device and the base station device; specifying, from the allocated one or more resources, one or more reuse resources that are reusable for a communication between the relay station device and the communication terminal device based on a reuse requirement, the reuse requirement being set with reference to a radio wave shielding ability of the shielded space; and transmitting the specified one or more reuse resources from the base station device to the relay station device.

According to another aspect of the present disclosure, a communication control program installed to a base station device, which communicates with a communication terminal device via a relay station device, is provided. The relay station device is located in a shielded space, and performs a downstream communication with the communication terminal device located in the shielded space concurrently with an upstream communication with the base station device. The communication control program includes instructions executed by the base station device and the instructions includes: allocating one or more resources to be used in a communication between the relay station device and the base station device; specifying, from the allocated one or more resources, one or more reuse resources that are reusable for a communication between the relay station device and the communication terminal device based on a reuse requirement, the reuse requirement being set with reference to a radio wave shielding ability of the shielded space; and transmitting the specified one or more reuse resources from the base station device to the relay station device.

According to another aspect of the present disclosure, a communication control method of a relay station device is provided. The relay station device is located in a shielded space, and performs a downstream communication with a communication terminal device located in the shielded space concurrently with an upstream communication with a base station device. The communication control method includes: adding a radio wave shielding ability of the shielded space to a connection request and transmitting the connection request to the base station device; acquiring one or more reuse resources that satisfy a reuse requirement, the reuse requirement being set with reference to the radio wave shielding ability of the shielded space; and allocating the one or more reuse resources to a communication between the relay station device and the communication terminal device.

According to another aspect of the present disclosure, a communication control program installed to a relay station device is provided. The relay device is located in a shielded space, and performs a downstream communication with a communication terminal device located in the shielded space concurrently with an upstream communication with a base station device. The communication control program includes instructions executed by the relay station device, and the instructions includes: adding a radio wave shielding ability of the shielded space to a connection request and transmitting the connection request to the base station device; acquiring one or more reuse resources that satisfy a reuse requirement, the reuse requirement being set with reference to the radio wave shielding ability of the shielded space; and allocating the one or more reuse resources to a communication between the relay station device and the communication terminal device.

In the above-described configuration, among the allocated communication resources, the communication resource, which has a low possibility of interference with the downstream communication, can be reused for the downstream communication. As described above, the relay station device and the communication terminal device are located in the shielded space, and the downstream communication is the communication between the relay station device and the communication terminal device. According to the present disclosure, it is possible to efficiently transmit and receive data while suppressing a decrease in resource use efficiency caused by relay operation of the relay station device.

The following will describe embodiments of the present disclosure with reference to the drawings.

The present disclosure is not limited to the following embodiments. Further, at least terms within the double quotation mean terms and phrases described in claims, and are not limited to the following embodiments.

Configurations and methods descried in dependent claims should be interpreted as arbitrary configurations and arbitrary methods within descriptions in independent claim. Configurations and methods of following embodiments corresponding to configurations and methods described in dependent claims, and configurations and methods described only in the following embodiments without descriptions in claims should be interpreted as arbitrary configurations and arbitrary methods in the present disclosure In a case that the scope of claims is broader than descriptions of the embodiments, configurations and methods described in the following embodiments are just examples of configurations and methods of the present disclosure, which should be interpreted as arbitrary configurations and arbitrary methods in the present disclosure. In any cases, essential configurations and methods of the present disclosure should be interpreted based on independent claims.

Any effects described in embodiments are effects obtained by a configuration of an embodiment as an example of the present disclosure, and are not necessarily effects of the present disclosure.

In the present disclosure, the configuration disclosed in each embodiment is not limited to each embodiment alone, but may be combined across the embodiments. For example, a configuration disclosed in one embodiment may be combined with other embodiments. Further, the disclosed configurations may be collected and combined in each of multiple embodiments.

The difficulty described in the present disclosure is not a publicly known difficulty, but person including the inventor has independently found out, and is a fact that affirms the inventive step of the present disclosure together with the configuration and method of the present disclosure.

1. Overall Configuration Example of Each Embodiment

The following will describe devices and a mutual relationship of the devices in each embodiment, and an overall configuration example of each embodiment with reference to FIG. 1.

A base station device 1 performs, through a relay station device 2, wireless communication with a communication terminal device 23 located in a shielded space 20 in which the relay station device 2 is located. The base station device 1 can also perform wireless communication directly with the communication terminal device 23 located in the shielded space 20 without using the relay station device 2. The "base station device" refers to a device that is installed as a relay base of the communication terminal device 23 and is connected to a backbone network. In a configuration where partial processes and functions are implemented by various server devices provided on front end of the backbone network, the "base station device" refers to the devices including the various server devices. The term "shielded space" refers to a space that is completely shielded, as well as a space in which radio waves are attenuated within the space compared with the radio waves outside of the space. For convenience, in the drawings, the base station device, the relay station device, the communication terminal device, and a communication resource are properly abbreviated as a base station, a relay station, a terminal, and a resource, respectively.

The relay station device 2 is located in the shielded space 20. The relay station device 2 includes an upstream antenna 21, which performs upstream communication with the base station device 1, and a downstream antenna 22, which performs downstream communication with the communication terminal device 23 located in the shielded space 20. The relay station device 2 can perform the upstream communication and the downstream communication at the same time. Here, "simultaneously" includes a case of being simultaneous in time, and a case of being continuous in time.

The shielded space 20 is a space in which a radio wave shielding structure (that is, radio wave shielding ability) is known. For example, the shielded space 20 include a space in which seats of a vehicle are provided, a hall, or a living room of a building, or the like. The downstream antenna 22 is installed in the shielded space 20. Thus, when the radio wave shielding ability of the shielded space 20 is known, it is possible to evaluate a possibility of interference between the downstream communication performed in the shielded space 20 and a communication outside the shielded space 20 based on the radio wave shielding ability. Examples of the radio wave shielding ability include a distance from the relay station device 2 at which radio waves are attenuated to a predetermined intensity, an attenuation rate of radio waves, or the like.

Hereinafter, the relay station device 2A of the vehicle A will be described. The base station device 1 evaluates an interference possibility between the downstream communication, which is performed between the relay station device 2A and the communication terminal device 23A in the shielded space 20A, and another communication, based on the radio wave shielding ability of the shielded space 20A. Based on evaluation result of the interference possibility, among the communication resources allocated to other communications, a communication resource determined to have a low interference possibility with the downstream communication is reallocated for the downstream communication. Here, examples of other communications may include a communication R1 between the relay station device 2A and the base station device 1, a communication R2 between the base station device 1 and a relay station device 2B, a communication R3 between the relay station device 2B and a communication terminal device 23B, and a communication R4 directly performed between the base station device 1 and the communication terminal device 23 B not using the relay station device 2B.

The relay station device 2A recognizes and communicates with the communication terminal device 23A that performs downstream communication in the shielded space 20 with the downstream antenna 22 installed in the shielded space 20A. The shielded space 20A is a space for which the radio wave shielding structure is specified. Then, the relay station device 2A notifies the specified number of connected communication terminal devices 23, which perform the upstream communications, to the base station device 1. The base station device 1 performs the upstream communication.

When the communication terminal device 23 is a smartphone, a mobile phone, a tablet, or the like, a wireless communication is performed between the communication terminal device and a wireless communication unit of the relay station device 2A, thereby performing a wireless communication between the communication terminal device and the base station device 1 via the relay station device 2A. As the wireless communication, short-range wireless communication, such as Bluetooth low energy (BLE) or Bluetooth (registered trademark) may be used in addition to an example of a communication method described later.

The base station device 1 allocates communication resource to the communication T (that is, the downstream communication) between the relay station device 2A and the communication terminal device 23, based on the information of the communication terminal device 23A notified by the relay station device 2A. At this time, the communication determined to have no interference with the communication T or the communication determined to be sufficiently weak relative to the communication T is extracted from the already allocated communications R1 to R4. The determination of interference or sufficiently weak intensity is performed based on the shielding structure of the shielded space 20. The communication resource, which has been allocated to one of the communications R1 to R4, may be allocated to the communication T as a reuse resource, and the reuse resource is notified to the relay station device 2A.

Accordingly, the relay station device 2A can allocate the reuse resource to each communication terminal device 23. For example, when the radio wave shielding ability of the shielded space 20 is high, the radio waves of the communication T in the shielded space 20 is sufficiently attenuated at a location of the upstream antenna 21, which is located outside of the shielded space 20. Thus, when the relay station device 2A performs the communication R1 with the base station device 1 exclusively via the upstream antenna 21, the base station device 1 may allocate the communication resource, which has been allocated to the communication R1, to the communication T as the reuse resource.

As the wireless communication method between the base station device 1 and the relay station device 2, between the relay station device 2 and the communication terminal device 23, and between the base station device 1 and the communication terminal device 23, for example, IEEE 802.11 (Wi-Fi (registered trademark)), IEEE 802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, 5G, or the like may be used. Alternatively, dedicated short range communication (DSRC) may be used.

2. First Embodiment (1) Configuration of Base Station Device 1

Figure 2:
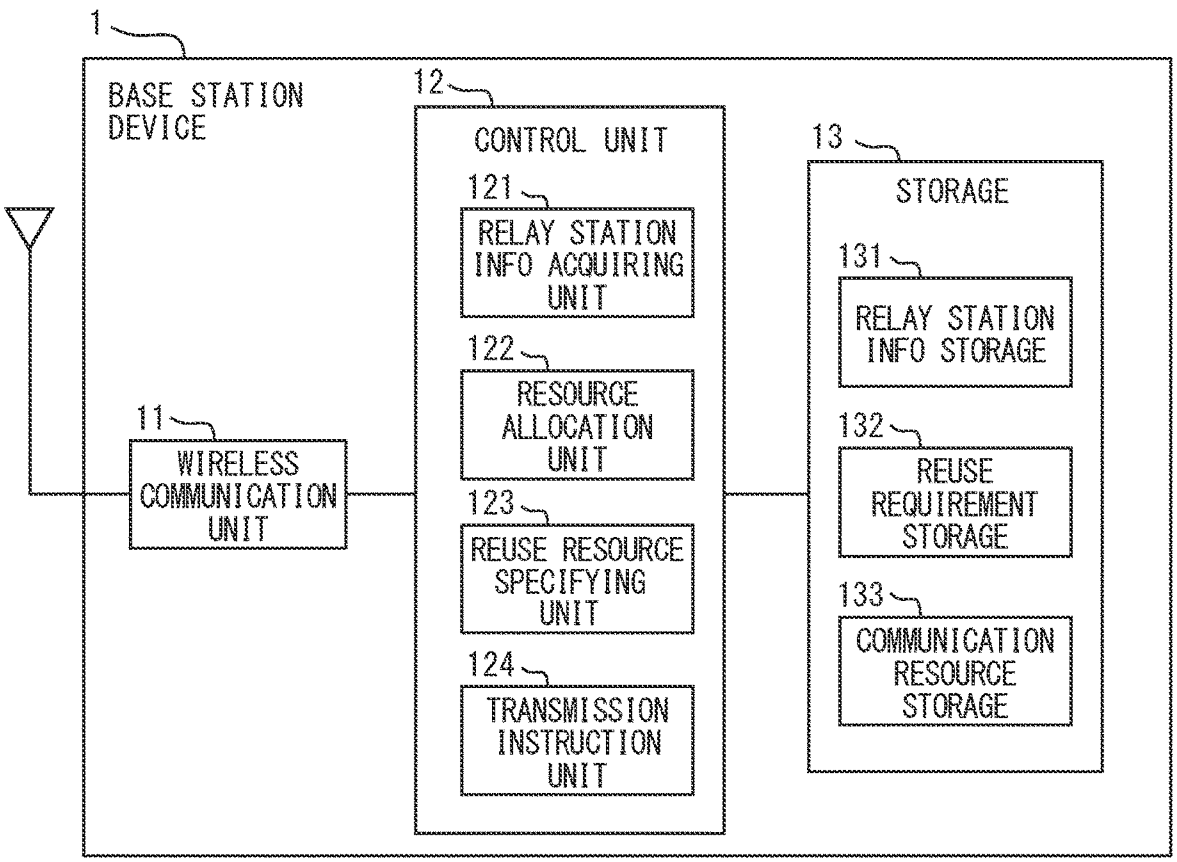
FIG. 2 is a block diagram illustrating a configuration example of a base station device according to a first embodiment of the present disclosure.

The following will describe a configuration of the base station device 1 according to the first embodiment with reference to FIG. 2. The base station device 1 includes a wireless communication unit 11, a control unit 12, and a storage 13.

The wireless communication unit 11 performs the "wireless communication" with the relay station device 2 and the communication terminal device 23, which are external communication devices. As described above, various communication methods can be used as the wireless communication method. In the present embodiment, 4G or 5G is assumed as the cellular communication method. The wireless communication method may correspond to multiple kinds of wireless communication methods. Here, the term "wireless communication" refers to transmission and reception of signals in wireless manner.

The control unit 12 implements a relay station information acquiring unit 121, a resource allocation unit 122, a reuse resource specifying unit 123, and a transmission instruction unit 124. The relay station information acquiring unit 121 acquires information of the relay station device 2, such as the radio wave shielding ability of the shielded space 20 and a list of the communication terminal devices 23 accommodated therein (see FIG. 1). The resource allocation unit 122 allocates communication resources to the communication between the relay station devices 2 and the base station device 1.

The reuse resource specifying unit 123 specifies the reuse resource satisfying a reuse requirement among the resources, which have been allocated by the resource allocation unit 122, with reference to the radio wave shielding ability acquired from the relay station device 2 and the reuse requirement of a reuse requirement storage 132. The transmission instruction unit 124 instructs transmission of the allocated resource and the reuse resource to the relay station device 2.

For example, the storage 13 may be provided by a non-volatile memory such as a flash memory or a hard disk, a volatile memory such as a RAM. Alternatively, the storage 13 may be provided by a removable storage medium such as a BD, a DVD, or an SD card. The storage 13 implements a relay station information storage 131, a reuse requirement storage 132, and a communication resource storage 133.

The relay station information storage 131 stores the acquired information related to the relay station device 2. The information related to the relay station device 2 may include the radio wave shielding ability of the shielded space 20, the terminal list of the communication terminal devices 23 accommodated in the shielded space 20, information related to reception data destined to the communication terminal device 23, information related to resource allocation request from the relay station device 2.

The reuse requirement storage 132 stores the reuse requirement set based on the radio wave shielding ability of the shielded space 20. Examples of the reuse requirement may include a distance (attenuation distance) from the relay station device 2 at which the radio wave intensity of the downstream communication attenuates to a predetermined intensity value, an attenuation rate of the radio wave intensity of the downstream communication corresponding to the distance from the relay station device 2, and a distance between two relay station devices defined corresponding to the attenuation distance and the attenuation rate of each relay station device. The reuse requirement storage 132 uses, as the reuse requirement, each above-described parameter alone or in combination.

The communication resource storage 133 stores communication resources used for communication performed by the base station device 1 and allocation of the communication resources. Examples of the information related to communication resource allocation may include a set of resources allocated to the communications performed outside the shielded space 20, a set of communication resources reusable for the communications performed inside or outside the shielded space 20, and a set of unallocated communication resources. The set of communication resources reusable for the communications performed inside or outside the shielded space 20 is generated among the set of allocated resources.

(2) Operation of Base Station Device 1

Figure 3:
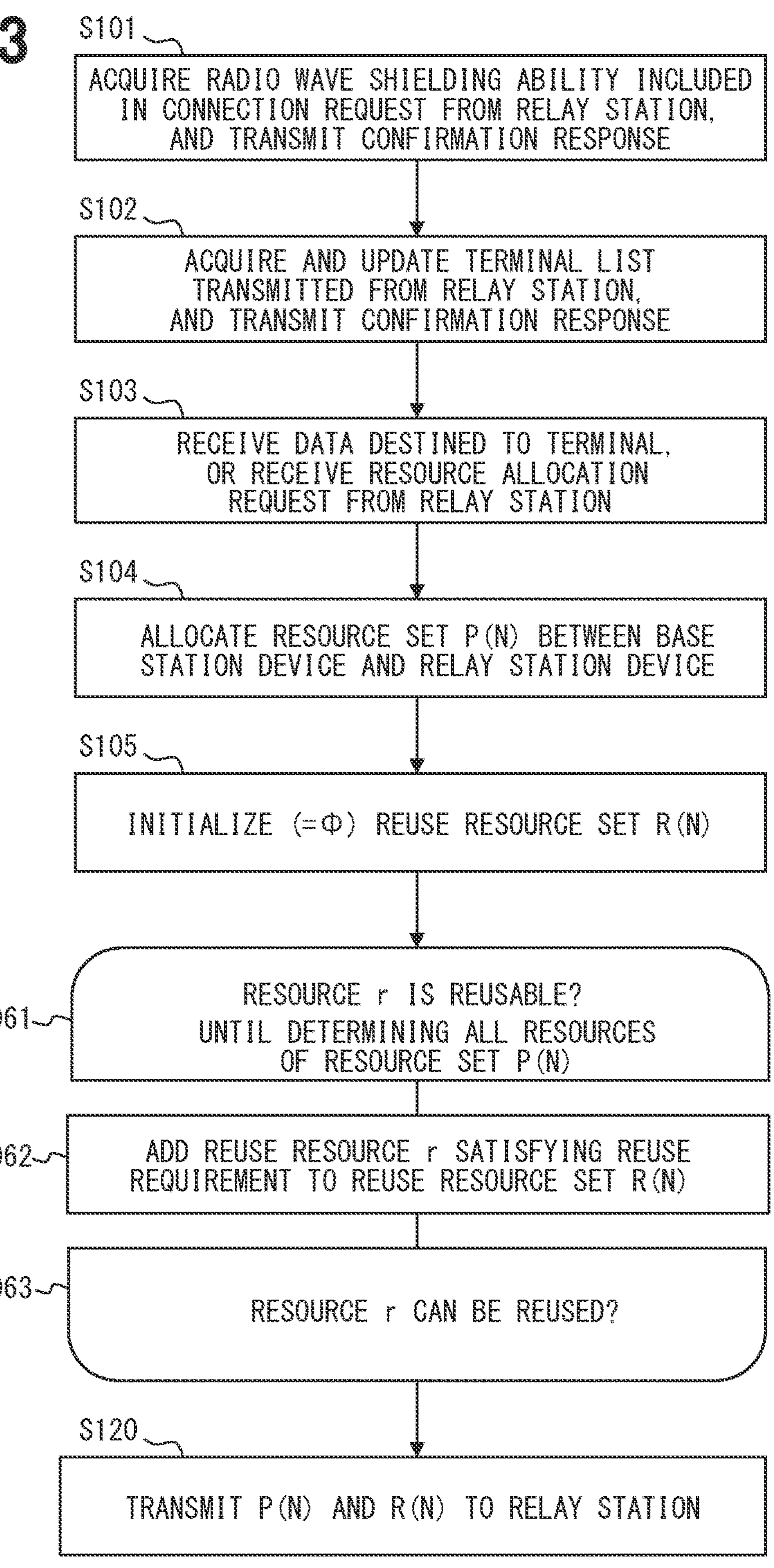
FIG. 3 is a flowchart illustrating an operation of the base station device according to the first embodiment of the present disclosure.

The operation of the base station device 1 according to the present embodiment will be described with reference to the flowchart of FIG. 3. Note that the following operation not only shows a communication control method executed by the base station device 1, but also shows a processing procedure of a communication control program executable by the base station device 1. The order of the processing procedure is not limited to the specific order shown in FIG. 3. That is, the order may be properly changed as long as there is no restriction such as a relationship in which a result of a previous step is used in a subsequent step.

In response to receiving a connection request (that is, an attach request) from the relay station device 2, the relay station information acquiring unit 121 of the base station device 1 acquires the radio wave shielding ability of the shielded space 20 in which the relay station device 2 is located from attribute information of the relay station device 2, and transmits a confirmation response to the relay station device 2 (S101). The attribute information of the relay station device 2 is included in the connection request. In this way, the base station device 1 acquires the radio wave shielding ability of the shielded space 20 of the relay station device 2, and stores the radio wave shielding ability in the relay station information storage 131.

The relay station information acquiring unit 121 receives and acquires, from the relay station device 2, an update of the terminal list of communication terminal devices 23 accommodated in the shielded space, and transmits a confirmation response to the relay station device 2 (S102). In this way, the base station device 1 receives the update of the communication terminal devices 23 from the relay station device 2, stores the update information in the relay station information storage 131, and maintains the terminal list accommodated in the relay station device 2 in the latest state.

The relay station information acquiring unit 121 receives data from the backbone network (that is, backbone network) to the communication terminal device 23 of the relay station device 2, or receives a resource allocation request from the relay station device 2 (S103). Reception of data destined to the communication terminal device 23 in the downlink communication from the base station device 1 or reception of the resource allocation request in the uplink communication from the relay station device 2 to the base station device 1 corresponds to the trigger of the allocation of the resource set P(N) (S104) and the specification of the reuse resource set R(N) (S1061, S1062, S1063). The information received by the relay station information acquiring unit 121 is stored in the relay station information storage 131.

The resource allocation unit 122 allocates a resource set P (N), which is a set of communication resources r, to the communication between (i) the base station device 1 and (ii) the relay station device 2 or the communication terminal device 23 (S104). The resource set P(N) is stored in the communication resource storage 133. The resource set P(N) is a set of allocated communication resources defined by frequency, time, code, and the like, and corresponds to "allocated resources." For example, fi indicates i-th frequency slot and ti indicates i-th time slot, an example of a communication resource is indicated by a combination (fi, ti) of a specific frequency slot and time slot. An example of the resource set P(N) includes combinations of specific frequency slots and time slots, such as {(f1, t1), (f3, t2), (f5, t7)}.

The reuse resource specifying unit 123 initializes the reuse resource set R(N) that can be reused for downstream communication between the relay station device 2 and the communication terminal device 23 using the resources included in the allocated resource set P(N) (S105).

The reuse resource specifying unit 123 determines whether each communication resource r of the resource set P(N) of the communication resource storage 133 satisfies the reuse requirement, and adds the communication resource r satisfying the reuse requirement to the reuse resource set R(N). This determination is repeatedly performed for all of the resources included in the resource set P(N), and the reuse resource set R(N) satisfying the reuse requirement is specified among the resources included in the resource set P(N) allocated by the resource allocation unit (S1061, S1062, S1063). The reuse resource set R(N) is stored in the communication resource storage 133.

S1061, S1062, S1063 are a loop for specifying the reuse resource set R (N) from the allocated resource set P(N), and the communication resource r included in the resource set P(N) is added to the reuse resource set R(N) when the communication (communication link) for which resource allocation is requested satisfies the reuse requirement. S1061, S1062, S1063 are performed for all of the communications to which the communication resources r have already been allocated. The reuse requirement is stored in the reuse requirement storage 132 as, for example, a table which specifies relationship that can be reused.

The transmission instruction unit 124 acquires the resource set P(N) and the reuse resource set R(N) from the communication resource storage 133, and transmits, using the wireless communication unit 11, the resource set P(N) and the reuse resource set R(N) to (i) the destination device of the downlink data or (ii) the relay station device 2, which is the transmission source of the resource allocation request for the uplink data (S120). As described above, the downlink data to the terminal device or the resource allocation request from the relay station device is received in S103.

(3) Modification Example of Base Station Device 1

Figure 4:
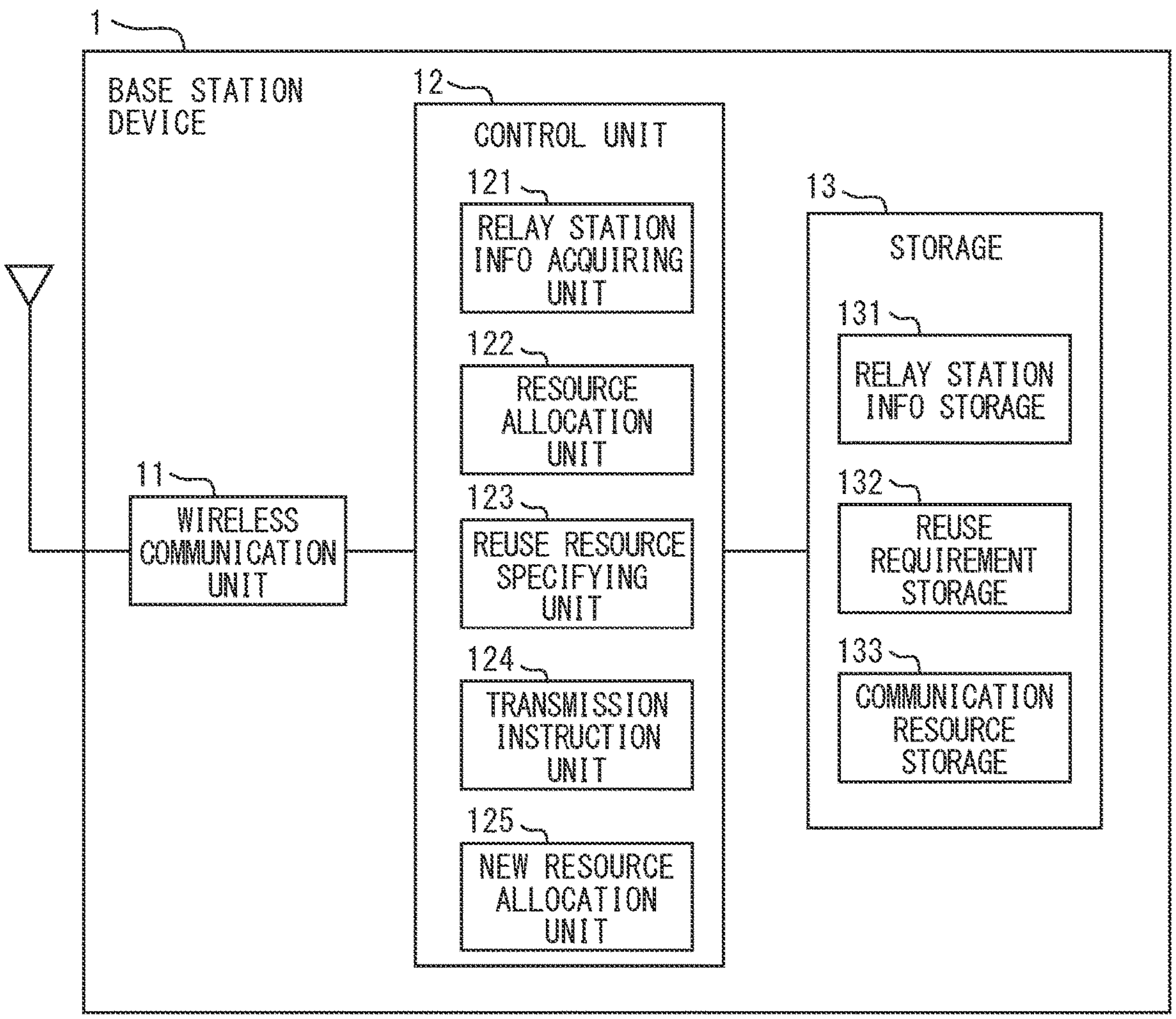
FIG. 4 is a block diagram illustrating a modification configuration of the base station device according to the first embodiment of the present disclosure.

As illustrated in FIG. 4, the control unit 12 of the base station device 1 may further include a new resource allocation unit 125 in addition to the relay station information acquiring unit 121, the resource allocation unit 122, the reuse resource specifying unit 123, and the transmission instruction unit 124. In response to reception of data destined to the communication terminal device 23 accommodated in the relay station device 2 or reception of the resource allocation request from the relay station device 2, the new resource allocation unit 125 generates a new resource set U(N), which includes unallocated resources different from the allocated resource set P(N) when the reuse resource set R(N) is insufficient. The generated new resource set U(N) is allocated to a deficiency in the downstream communication performed by the relay station device 2.

When the reuse resource set R(N) is insufficient for the resource allocation request, the transmission instruction unit 124 instructs transmission of the new resource set U(N) including unallocated resources in addition to the sets P(N) and R(N) to the relay station device 2.

(4) Operation of Base Station Device 1 According to Modification Example

The operation of the base station device 1 according to the modification example of the present disclosure will be described with reference to the flowchart of FIG. 5. In the modification example of the base station device 1, after the reuse resource set R(N) is specified (S1061, S1062, S1063), the new resource allocation unit 125 determines (S107) whether the total resource amount of R(N) is smaller than (i) the data received by the base station device 1 or (ii) allocation request amount corresponding to the resource allocation request (received in S103).

When the total resource amount of the reuse resource set R(N) is smaller than the allocation request amount (Y (YES) in S107), the process proceeds to S108. The new resource allocation unit 125 allocates unallocated communication resources different from the resource set P(N) as the new resource set U(N) for the insufficient resources (S108). The new resource set U(N) is stored in the communication resource storage 133.

When the total resource amount of the reuse resource set R(N) is equal to or larger than the allocation request amount (N (No) in S107), the process proceeds to S109. The new resource allocation unit 125 initializes the new resource set U(N) as an empty set (=φ) (S109).

The transmission instruction unit 124 acquires the allocated resource set P(N), the reuse resource set R(N), and the new resource set U(N) from the communication resource storage 133, and instructs transmission of the resource set P(N), the reuse resource set R(N), and the new resource set U(N) to the relay station device 2 (S130). Since the base station device 1 transmits the new resource set U(N) to the relay station device 2 in addition to the allocated resource set P(N) and the reuse resource set R(N), the relay station device 2 can use the new resource, which are not allocated to the resource set P(N), for the communication with the communication terminal device 23 when necessary.

As described above, according to the base station device 1, the communication control method, and the data communication control program of the present embodiment, a communication resource having a low possibility of interference is specified on the basis of the radio wave shielding ability of the shielded space, and the specified communication resource is reused for communication within the shielded space. Thus, it is possible to suppress a decrease in the use efficiency of the communication resource due to relay. The base station device 1 is not concerned with the allocation of communication resources to the individual communication terminal devices 23 by the relay station device 2. Thus, it is possible to reduce the processing cost of the base station device 1 and the control information necessary for the communication between the base station device 1 and the relay station device 2.

3. Second Embodiment (1) Configuration of Relay Station Device 2

Figure 6:
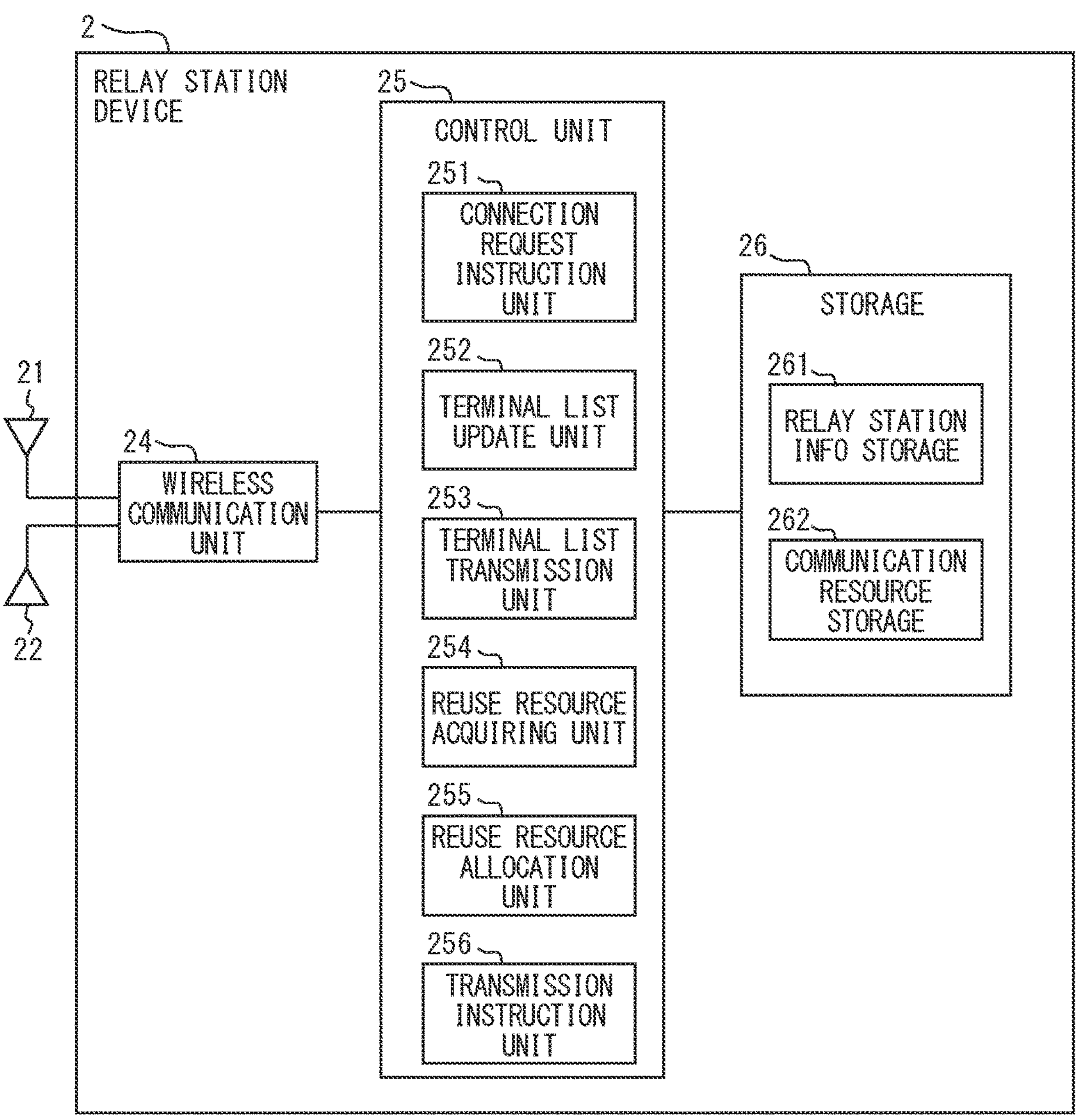
FIG. 6 is a block diagram illustrating a configuration example of a relay station device according to a second embodiment of the present disclosure.

The following will describe a configuration of the relay station device 2 according to the second embodiment with reference to FIG. 6. The relay station device 2 performs downstream communication with the communication terminal device 23 (see FIG. 1) in the shielded space 20 concurrently with the upstream communication with the base station device 1, and relays communication between the communication terminal device 23 and the base station device 1. The relay station device 2 is located in the shielded space 20.

The relay station device 2 includes an upstream antenna 21, a downstream antenna 22, a wireless communication unit 24, a control unit 25, and a storage 26.

The relay station device 2 may include a general-purpose central processing unit (CPU), a volatile memory such as a RAM, a non-volatile memory such as a ROM, a flash memory, or a hard disk, various interfaces, and an internal bus connecting the components with one another. By executing software on the above-described hardware, the function of each functional block described in FIG. 6 can be executed. Alternatively, the relay station device 2 may be implemented by a dedicated hardware circuit, such as a large-scale integration (LSI).

The relay station device 2 may be implemented as a component, a semi-finished product, or a finished product. For example, as a component, the relay station device 2 may be implemented by a semiconductor circuit or a semiconductor module. As a semi-finished product, the relay station device 2 may be implemented by an ECU. As a finished product, the relay station device 2 may be implemented by a personal computer (PC), a workstation, a smartphone, or a cellular phone.

The wireless communication unit 24 performs the upstream communication in wireless manner with the base station device 1 via the upstream antenna 21 as shown in FIG. 1. The wireless communication unit 24 performs the downstream communication with the communication terminal device 23 located in the shielded space 20 via the downstream antenna 22 in wireless manner as shown in FIG. 1.

The control unit 25 includes, as functional blocks, a connection request instruction unit 251, a terminal list update unit 252, a terminal list transmission unit 253, a reuse resource acquiring unit 254, a reuse resource allocation unit 255, and a transmission instruction unit 256.

When performing a connection request to the base station device 1, the connection request instruction unit 251 transmits attribute information of the shielded space 20, which includes the radio wave shielding ability of the shielded space 20 and is stored in a relay station information storage 261 of the storage 26, to the base station device 1. Then, the connection request instruction unit 251 receives a confirmation response from the base station device 1 in response to the connection request. Accordingly, the base station device 1 can specify the reuse resource set R(N) from the allocated resource set P(N) by using the radio wave shielding ability of the shielded space 20. The terminal list update unit 252 updates the list of accommodated terminals, which is stored in the relay station information storage 261, when a connection request is received from a new communication terminal device 23 or when disconnection of a connected communication terminal device 23 is detected. The terminal list transmission unit 253 transmits the updated accommodated terminal list to the base station device 1, and receives a confirmation response from the base station device 1.

The reuse resource acquiring unit 254 acquires, from the base station device 1, one or more reuse resources that satisfy the reuse requirement. The reuse requirement is set based on the radio wave shielding ability of the shielded space 20. The reuse resource is stored in a communication resource storage 262 of the storage 26. The reuse resource allocation unit 255 acquires the reuse resource, and allocates the acquired reuse resource to the downstream communication between the relay station device 2 and the communication terminal device 23. The transmission instruction unit 256 instructs transmission of the allocation result of reuse resource to the communication terminal device 23, which is located in the shielded space 20.

For example, the storage 26 may be provided by a non-volatile memory such as a flash memory or a hard disk, a volatile memory such as a RAM. Alternatively, the storage 26 may be provided by a removable storage medium such as a BD, a DVD, or an SD card. The storage 26 implements the relay station information storage 261 and the communication resource storage 262, The relay station information storage 261 stores the radio wave shielding ability of the shielded space, the accommodated terminal list of the communication terminal devices accommodated in the shielded space, or the like. The communication resource storage 262 stores information on communication resources received from the base station device 1. The information on communication resources may include the resource set P(N) including allocated resources, the reuse resource set R(N), and the new resource set U(N).

(2) Operation of Relay Station Device 2

Figure 7:
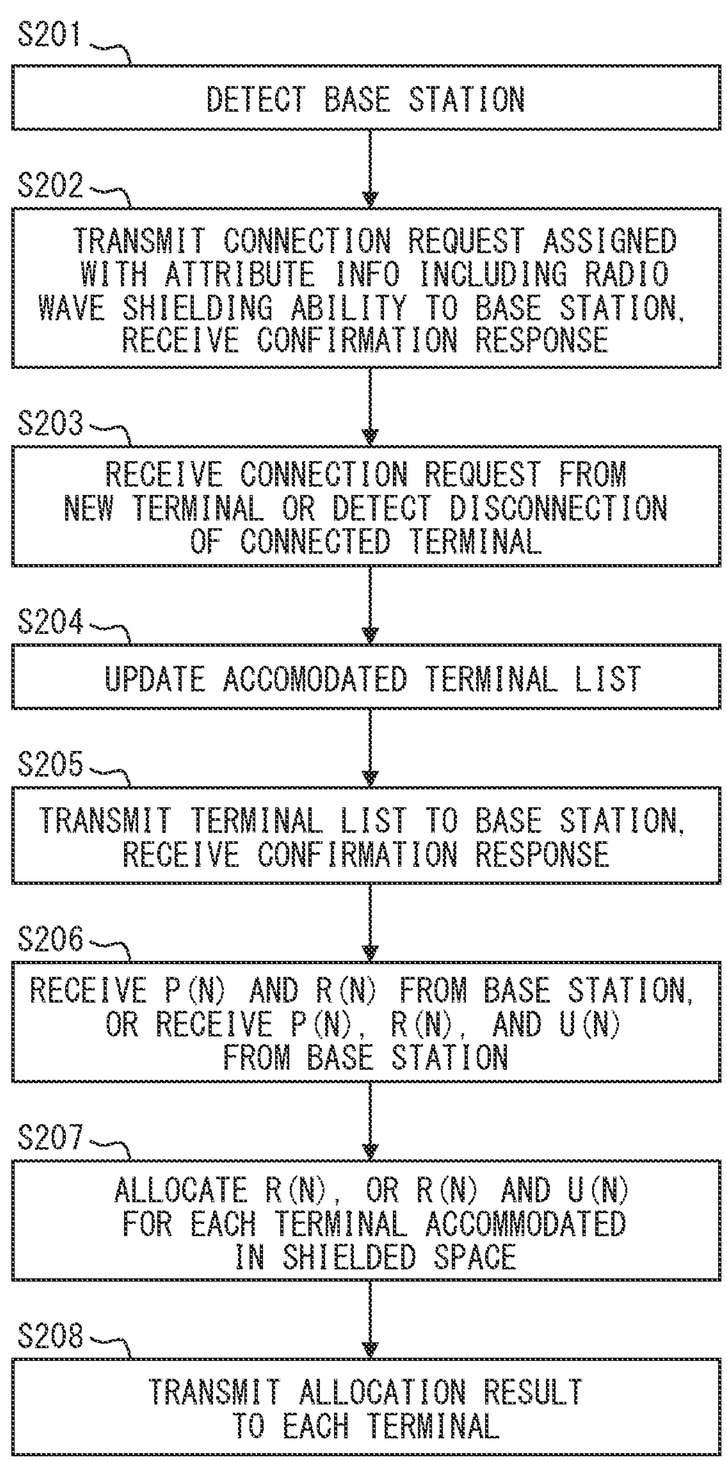
FIG. 7 is a flowchart illustrating an operation of a relay station device according to the second embodiment of the present disclosure.

The operation of the relay station device 2 according to the present embodiment will be described with reference to the flowchart of FIG. 7. Note that the following operation not only shows a communication control method executed by the relay station device 2, but also shows a processing procedure of a communication control program executable by the relay station device 2. The procedure is not limited to the execution order illustrated in FIG. 7. That is, the order may be properly changed as long as there is no restriction such as a relationship in which a result of a previous step is used in a subsequent step.

The connection request instruction unit 251 of the relay station device 2 detects the base station device 1 (S201), and then transmits a connection request to the base station device 1 and receives a confirmation response from the base station device 1 (S202). The connection request is assigned with the attribute information, which includes the radio wave shielding ability of the shielded space 20 (see FIG. 1).

The terminal list update unit 252 receives a connection request from a new communication terminal device 23, or detects a disconnection of the communication terminal device 23, which is being connected by the downstream communication (S203). Then, the terminal list update unit 252 updates the terminal list of the communication terminal devices 23 accommodated in the shielded space 20 (S204). The terminal list is stored in the relay station information storage 261. The terminal list transmission unit 253 transmits the terminal list, which is acquired from the terminal list update unit 252 or from the relay station information storage 261, to the base station device 1, and receives a confirmation response from the base station device 1 (S205).

The reuse resource acquiring unit 254 receives the resource set P(N) and the reuse resource set R(N) from the base station device 1 (S206). Alternatively, the reuse resource acquiring unit 254 may receive the resource set P(N), the reuse resource set R(N), and the new resource set U(N) from the base station device 1 (S206). The reuse resource allocation unit 255 determines allocation of resources included in the (i) reuse resource set R(N) or (ii) the reuse resource set R(N) and the new resource set U(N) for each communication terminal device 23 accommodated in the shielded space 20 (S207). The transmission instruction unit 256 transmits, to the communication terminal device 23, (i) the allocation result of resources included in the reuse resource set R (N), or (ii) the allocation result of resources included in the reuse resource set R(N) and the new resource set U(N).

As described above, according to the relay station device 2, the communication control method, and the communication control program of the present embodiment, the base station device 1 can specify a communication resource having a low possibility of interference with the communication on the downstream side of the shielded space 20 by adding the radio wave shielding ability of the shielded space 20 to the connection request and transmitting this connection request to the base station device 1. By reusing a communication resource having a low possibility of interference for downstream communication in the shielded space 20, it is possible to suppress a decrease in use efficiency of a communication resource, which is caused by the relay operation of the relay station device 2. The base station device 1 is not concerned with the allocation of communication resources to the individual communication terminal devices 23 by the relay station device 2. Thus, it is possible to reduce the processing cost of the base station device 1 and the control information necessary for the communication between the base station device 1 and the relay station device 2.

4. Specific Example of Reuse Requirement

The following will describe an example of a reuse table, which is an example of the reuse requirement, with reference to FIG. 8. The reuse table defines a classification of communication T to which a communication resource is newly allocated and a communication R to which a communication resource has been allocated when the base station device 1 receives data destined to the relay station device 2 or receives the resource allocation request from the relay station device 2. The communication T using the reuse resource is classified according to the structure type and shielding ability (that is, the attenuation distance D) of the shielded space 20 in which the communication terminal device 23 is accommodated. The communication R to which the communication resource has been allocated is classified based on the device involved in the communication. The reuse requirement is defined for each combination of the communication T, which is classified based on the structure type and the shielding ability, and the communication R, to which the communication resource has been allocated based on the device involved in the communication.

The reuse requirement defines, for each combination, whether the allocated communication resource of the communication R can be reused (that is, available) or not (that is, unavailable) as the communication resource r of the communication T for the downlink communication from the base station device 1 to the relay station device and the uplink communication from the relay station device to the base station device 1. The structure type that is not reusable in any of the communications R1, R2, and R3 is not described in the reuse table. For example, when the attenuation distance D of the vehicle is longer than b (b<D), reuse is not possible in any of the cases where the communication R is R1, R2, or R3, and thus the case in which attenuation distance D is longer than b is not described in the reuse table. In the reuse table, the reusability of downlink communication resource with another downlink communication resource is examined, and the reusability of uplink communication resource with another uplink communication resource is examined.

The attenuation distance in the reuse table is a distance from the relay station device 2 at which the intensity of radio waves used for downstream communication from the relay station device 2 to the communication terminal device 23 in the shielded space 20 attenuates to a predetermined level or lower. The predetermined level can be appropriately set, and examples thereof include a preset ratio (for example, half) to the radio wave intensity in the shielded space 20, a preset radio wave intensity, or the like. Here, the "predetermined level" includes not only a constant value but also a value that changes according to a predetermined condition.

Figures 9A, 9B:
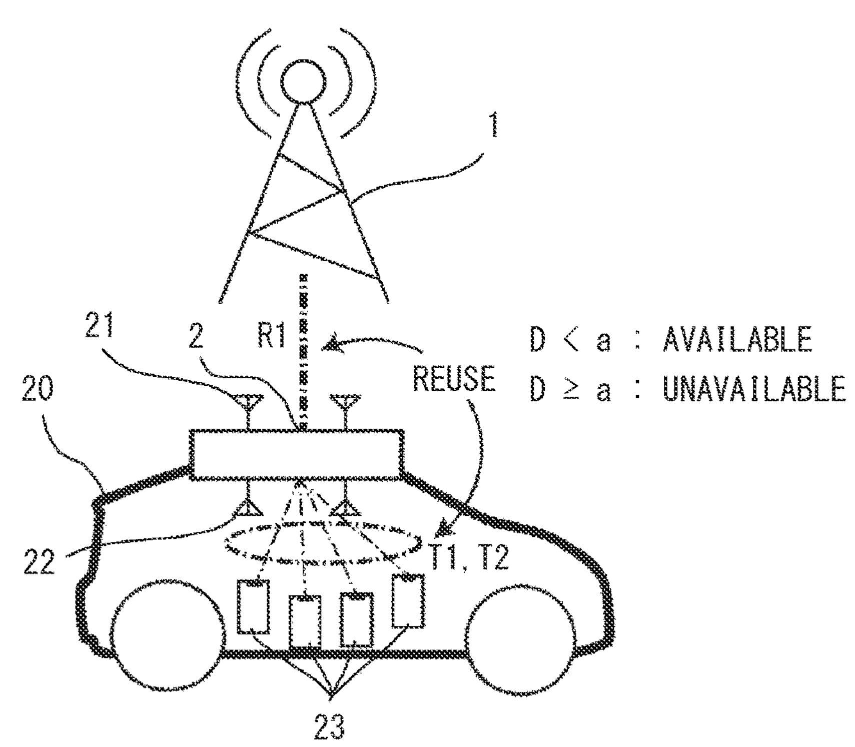
FIGS. 9A and 9B are diagrams illustrating reuse of communication R1 shown in FIG. 8.

The following will describe, with reference to FIG. 9A, whether the communication resource allocated to the communication R1 to be performed between the relay station device 2 and the base station device 1 can be reused when the shielded space 20 in which the relay station device 2 is located is a vehicle. The relay station device 2 performs the communication T using the reuse resource within the shielded space 20. In this case, whether the communication resource can be reused is determined based on the shielding ability of the shielded space 20 for both downlink and uplink communications. When the shielding ability of the shielded space 20 is greater than a predetermined value (communication T1), the attenuation distance D is less than a predetermined value a, and thus the communication resource of the communication R1 can be reused. When the shielding ability of the shielded space 20 is equal to or lower than the predetermined value (communication T2), the attenuation distance D is equal to or greater than the predetermined value a, and thus the communication resource of the communication R1 cannot be reused.

As shown in FIG. 9B, in a case where the shielded space 20 in which the relay station device 2 performing the communication T is located is a building, the reusability determination is performed in similar manner by determining whether the communication resource, which has been allocated to the communication R1 between the relay station device 2 and the base station device 1, can be reused. That is, in both downlink communication and uplink communication, when the attenuation distance D is less than a predetermined value c (communication T3), the communication resource of the communication R1 can be reused for the communication T3. When the attenuation distance D is equal to or greater than the predetermined value c, the communication resource of the communication R1 cannot be reused.

Figure 10A:
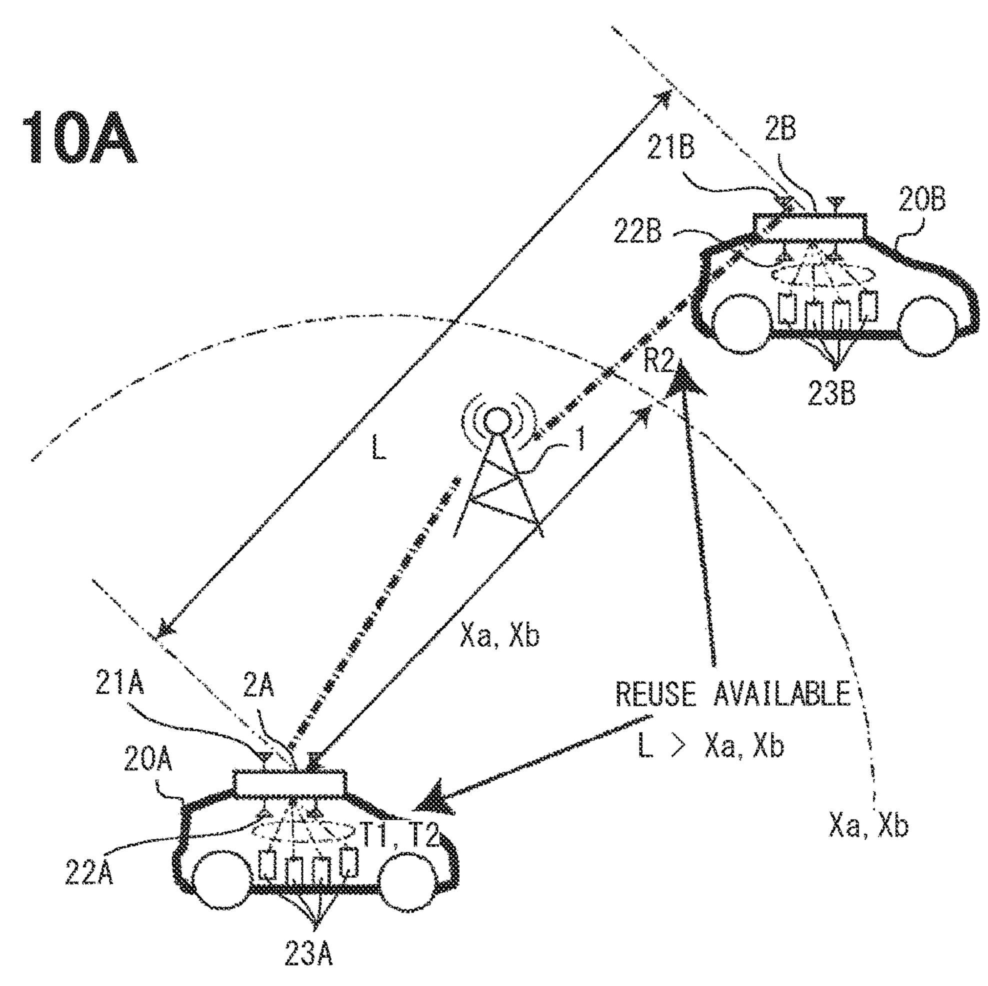
FIGS. 10A and 10B are diagrams illustrating reuse (uplink) of communication R2 shown in FIG. 8.
Figure 10B:
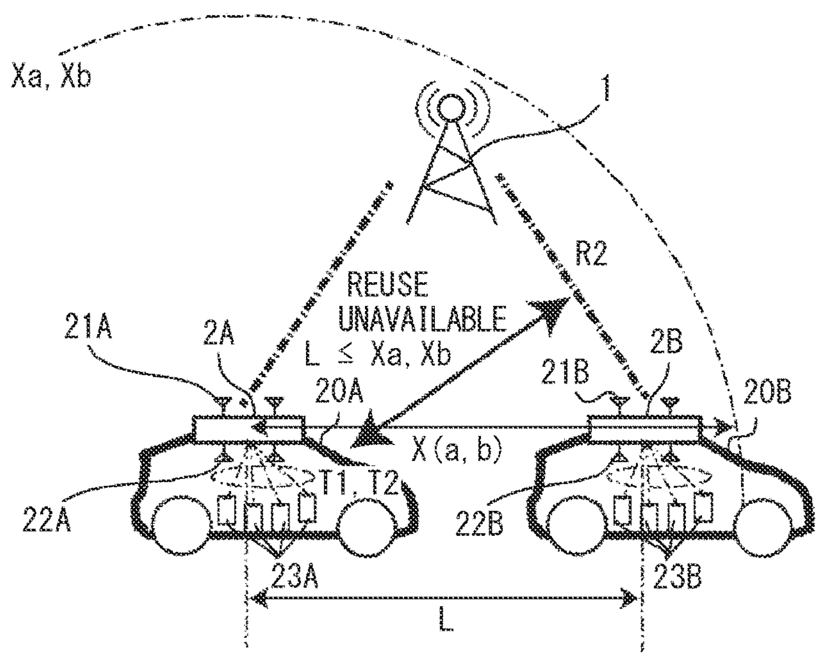

The following will describe, with reference to FIG. 10A and FIG. 10B, the availability of reuse in a case where the shielded space 20A in which the relay station device 2A is located is a vehicle. The relay station device 2A performs the communication T using the reuse resource. In the examples illustrated in the drawings, the communication R2 performed between the relay station device 2B located in the vehicle and the base station device 1 corresponds to the communication R to which the communication resource has been allocated. The radio wave of the uplink communication R2 from another relay station device 2B to the base station device 1 reaches the relay station device 2A, and the intensity of the radio wave at the relay station device 2A varies depending on the positional relationship between the relay station device 2A and the relay station device 2B. Thus, whether the communication R2 is reusable is determined by comparing a distance between the relay station device 2A and the relay station device 2B with a predetermined distance Xa, Xb. The predetermined distance is preliminarily defined according to the structure type of the shielded space 20A in which the relay station device 2A is located.

When the shielded space 20 corresponds to the structure type T1, the distance Xa is defined as a distance at which the communication T between the relay station device 2A and the communication terminal device 23A does not interfere with the communication R2 between the base station device 1 and another relay station device 2B. When the shielded space 20 corresponds to the structure type T2, the distance Xb is defined as a distance at which the communication T between the relay station device 2A and the communication terminal device 23A does not interfere with the communication R2 between the base station device 1 and another relay station device 2B. Thus, similar to the predetermined value relationship a<b of the attenuation distances, the predetermined distances Xa, Xb satisfy the relationship Xa<Xb.

As illustrated in FIG. 10A, in a case where the shielded space 20A of the relay station device 2A corresponds to the structure type T1 and the distance L between the relay station device 2A and the relay station device 2B is larger than the predetermined distance Xa (L>Xa), the possibility of interference between the communication R2 and the communication T is low. Thus, the communication resource allocated to the communication R2 can be reused for the communication T. Similarly, in a case where the shielded space 20A of the relay station device 2A corresponds to the structure type T2 and the distance L is larger than the predetermined distance Xb (L>Xb), the communication resource allocated to the communication R2 can be reused for the communication T.

As illustrated in FIG. 10B, in a case where the shielded space 20A of the relay station device 2A corresponds to the structure type T1 and the distance L between the relay station device 2A and the relay station device 2B is equal to or less than the predetermined distance Xa (L≤Xa), the possibility of interference between the communication R2 and the communication T is high. Thus, the communication resource allocated to the communication R2 cannot be reused for the communication T. Similarly, in a case where the shielded space 20A of the relay station device 2A corresponds to the structure type T2 and the distance L is equal to or less than the predetermined distance Xb (L≤Xb), the communication resource allocated to the communication R2 cannot be reused for the communication T.

Unlike the uplink communication R2, the radio wave intensity of the downlink communication R2 from another relay station device 2B to the base station device 1 is not affected by the positional relationship between the relay station device 2A and the relay station device 2B. Thus, as illustrated in the reuse table of FIG. 8, when the shielded space 20A of the relay station device 2A corresponds to the structure type T1 (D<a), it is possible to reuse the communication resource allocated to the communication R2 for the communication T. In other cases (D≥a), the reuse of allocated communication resource for communication R2 is disabled.

In a case where the relay station device 2A is located in a building, for the uplink communication, similarly to a case where the relay station device 2A is located in a vehicle, the reusability is determined based on a predetermined distance Xc. The predetermined distance Xc is defined as a distance at which the communication T and the communication R2 do not interfere with one another. Specifically, when the shielded space 20A of the building corresponds to the structure type T3 (D<c) and the distance L between the relay station device 2A and the relay station device 2B is larger than the predetermined distance Xc (L>Xc), the communication resource allocated to the communication R2 can be reused for the communication T. When the distance L is equal to or less than the predetermined distance Xc (L≤Xc), the communication resource allocated to the communication R2 cannot be reused for the communication T. For the downlink communication, when the shielded space 20A of the building corresponds to the structure type T3 (D<c), the communication resource allocated to the communication R2 can be reused for the communication T. In other cases (D≥c), the resource allocated to communication R2 is not allowed to be reused for the communication T.

In FIG. 8, FIG. 10A, and FIG. 10B, the communication R2 is communication between the base station device 1 and another relay station device 2B. Alternatively, the communication terminal device 23B may directly communicate with the base station device 1 without using another relay station device 2B. In this case, the distance between the relay station device 2A and the communication terminal device 23B is compared with the distance Xa or Xb to determine whether the communication R2 can be reused.

Figure 11A:
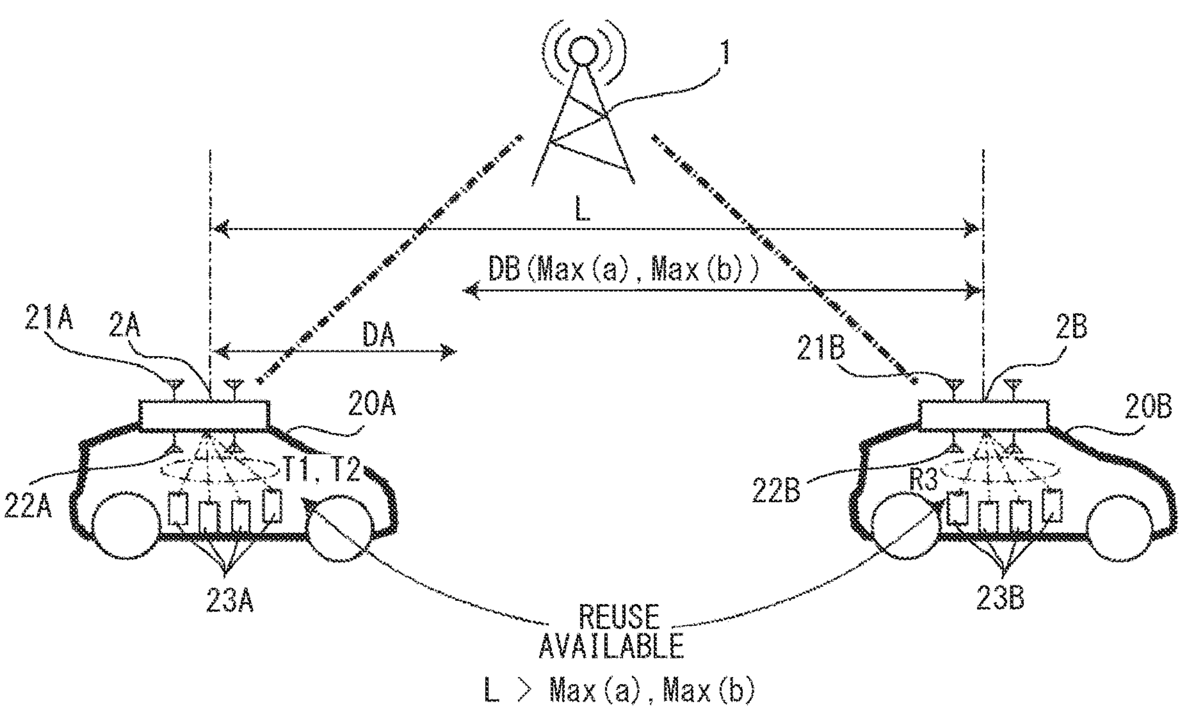
FIGS. 11A and 11B are diagrams illustrating reuse of communication R3 shown in FIG. 8.
Figure 11B:
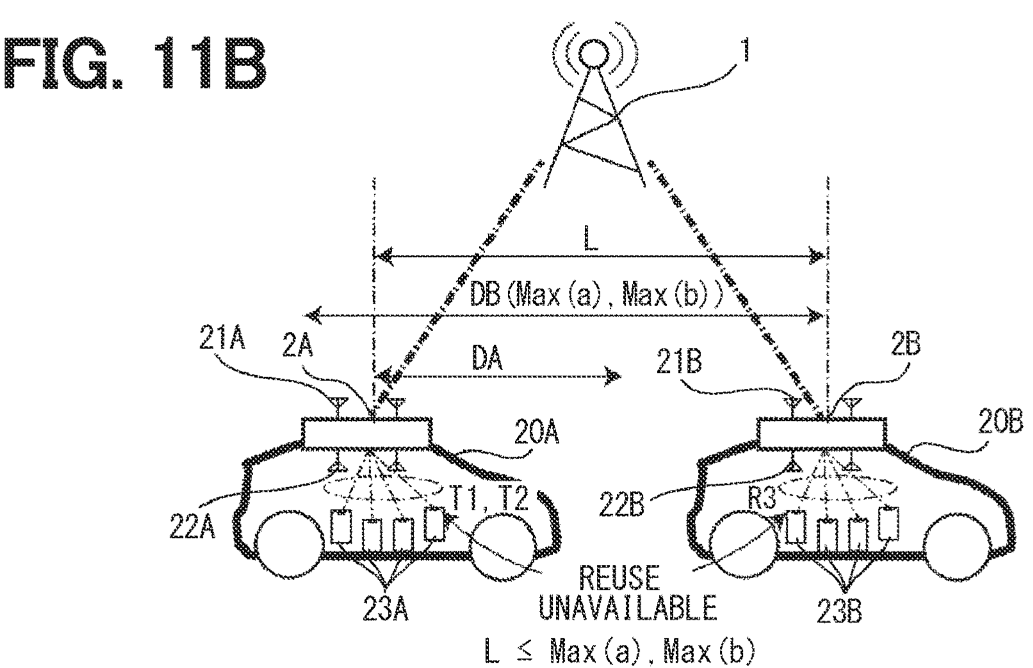

The following will describe, with reference to FIG. 11A and FIG. 11B, whether the communication resource allocated to the communication R3 is reusable for the communication T. Similarly to the communication (T), the communication R3 is a communication between the relay station device 2B and the communication terminal device 23B accommodated therein. In this case, in addition to the shielding ability of the shielded space 20A in which the relay station device 2A is located, a shielding ability of a shielded space 20B in which the relay station device 2B is located also needs to be considered. When determining whether the reuse of the communication resource is possible, the distance L between the relay station device 2A and the relay station device 2B is compared with a larger distance Max (a) and Max (b) between the attenuation distance DA of the shielded space 20 and the attenuation distance DB of the shielded space 20B.

As illustrated in FIG. 11A, when the attenuation distance DB of the shielded space 20 B in which the relay station device 2B is located is larger than the attenuation distance DA of the shielded space 20 A in which the relay station device 2A is located, the distance L between the relay station device 2A and the relay station device 2B is compared with the attenuation distance DB. When the attenuation distance DA<a, the attenuation distance DB becomes Max(a), and when a attenuation distance DA<b, the attenuation distance DB becomes Max(b). When the distance L is larger than the attenuation distance DB (L>Max(a), L>Max(b)), the communication resource allocated to the communication R3 can be reused for the communication T. When the distance L is equal to or less than the attenuation distance DB (L≤Max(a), L≤Max(b)), the communication resource allocated to the communication R3 cannot be reused for the communication T.

When the shielded space 20 in which the relay station device 2 performing the communication (T) is located is a building, both the downlink and the uplink communications are the same as those of the communication R1.

5. Overview

The features of the devices, the method, and the program according to each embodiment of the present disclosure have been described above.

The terms used in each embodiment are exemplary terms, and the terms may be replaced with terms that are synonymous or include synonymous functions.

The block diagrams used for the description of the embodiments are obtained by classifying and arranging the configuration of the device for each function. The blocks representing the respective functions may be implemented by any combination of hardware or software. Since the block diagrams illustrate the functions, the block diagrams can be understood as disclosure of the method and the program implementing the corresponding method.

Functional blocks that can be understood as processes, flows, and methods described in the respective embodiments may be changed in order as long as there is no restriction such as a relationship in which results of preceding other steps are used in one step.

The terms of first, second, and N-th (N is an integer) used in each embodiment and the claims are used to distinguish two or more configurations of the same type and two or more methods of the same type and do not limit the order and superiority and inferiority.

Although each embodiment is described under a condition that device is mounted on the vehicles, the present disclosure also includes dedicated or general-purpose device other than device for vehicle use purpose, unless otherwise limited in the claims.

In the above embodiment, the device described in each embodiment is mounted on the vehicle. Alternatively, the device may be carried by a pedestrian.

Further, examples of the devices of the present disclosure may include the following configurations. As an electronic component, the device may include semiconductor elements, electronic circuits, modules, microcomputers. As a semi-finished product, the device may include electronic control units (ECU) and system boards. As a completely finished product, the device may include a mobile phone, a smartphone, a tablet, a personal computer (PC), a workstation, or a server. Other examples may include devices having communication functions, such as a video camera, a still camera, or a car navigation system.

Each device may additionally include necessary functions, such as an antenna and a communication interface.

The devices of the present disclosure are assumed to be used for the purpose of providing various services. When providing such various services, the devices of the present disclosure may be used, the method of the present disclosure may be used, or/and the program of the present disclosure may be executed.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. Consequently, as the program is upgraded, the corresponding latest function can be always provided.

INDUSTRIAL APPLICABILITY

The device according to the present disclosure can improve communication efficiency by reusing the communication resource having a low possibility of interference among communication resources allocated to the communication between the communication terminal device and the relay station device located in the shielded space. The shielded space may include a vehicle or a building, which has a radio wave shielding ability.

What is claimed is:

1. A base station device communicating with a communication terminal device via a relay station device, the relay station device being located in a shielded space and performing a downstream communication with the communication terminal device located in the shielded space concurrently with an upstream communication with the base station device, the base station device comprising:

a resource allocation unit allocating one or more resources to be used in a communication between the relay station device and the base station device or a communication between another relay station device and the base station device;

a reuse requirement storage storing a reuse requirement, which is set based on a radio wave shielding ability of the shielded space, the shielded space is defined by a radio wave shielding structure and radio waves from the base station device are attenuated within the shielded space compared with radio waves outside of the shielded space, the relay station device is attached to the radio wave shielding structure such that an upstream antenna of the relay station device performing the upstream communication with the base station device is located outside the radio wave shielding structure and a downstream antenna of the relay station device performing the downstream communication with the communication terminal device is located inside the radio wave shielding structure, the reuse requirement indicating a requirement for the one or more resources that can be reused in the downstream communication between the relay station device and the communication terminal device;

a relay station information acquiring unit acquiring information of the relay station device, the information of the relay station device including the radio wave shielding ability of the shielded space;

a reuse resource specifying unit specifying one or more reuse resources whose radio wave shielding abilities satisfy the reuse requirement from the one or more resources that have been allocated by the resource allocation unit, the reuse resource being used in the communication between the relay station device and the communication terminal device; and a transmission instruction unit instructing transmission of the specified one or more reuse resources to the relay station device.

2. The base station device according to claim 1, further comprising a new resource allocation unit that allocates one or more new resources different from the allocated one or more resources when (i) the base station device receives data destined to the communication terminal device, which is located in the shielded space together with the relay station device, and the one or more reuse resources are insufficient for the received data, or when (ii) the base station device receives a resource allocation request from the relay station device and the one or more reuse resources are insufficient for the received resource allocation request, wherein, when the one or more reuse resources are insufficient for the resource allocation request, the transmission instruction unit instructs transmission of the allocated one or more resource, the one or more reuse resource, and the one or more new resources to the relay station device.

3. The base station device according to claim 1, wherein the reuse requirement storage stores, as the reuse requirement, an attenuation distance from the relay station device at which a radio wave intensity of the downstream communication attenuates to a predetermined value.

4. The base station device according to claim 1, wherein the reuse requirement storage stores, as the reuse requirement, (i) an attenuation distance from the relay station device at which a radio wave intensity of the downstream communication attenuates to a predetermined value and (ii) a distance corresponding to the attenuation distance between the relay station device and another relay station device.

5. A relay station device being located in a shielded space and relaying a communication between a communication terminal device and a base station device, the relay station device performing a downstream communication with the communication terminal device located in the shielded space concurrently with an upstream communication with the base station device, the relay station device comprising:

a relay station information storage storing a radio wave shielding ability of the shielded space, the shielded space is defined by a radio wave shielding structure and radio waves from the base station device are attenuated within the shielded space compared with radio waves outside of the shielded space, the relay station device is attached to the radio wave shielding structure such that an upstream antenna of the relay station device performing the upstream communication with the base station device is located outside the radio wave shielding structure and a downstream antenna of the relay station device performing the downstream communication with the communication terminal device is located inside the radio wave shielding structure;

a connection request instruction unit instructing transmission of the radio wave shielding ability of the shielded space to the base station device;

a reuse resource acquiring unit acquiring, from the base station device, one or more reuse resources satisfying a reuse requirement, the one or more reuse resources being specified from one or more resources that have been allocated for a communication between the relay station device and the base station device or a communication between another relay station device and the base station device when radio wave shielding abilities of the one or more reuse resources satisfy the reuse requirement; and a reuse resource allocation unit allocating the one or more reuse resources to a communication between the relay station device and the communication terminal device, wherein the reuse requirement indicates a requirement for the one or more resources that can be reused in the downstream communication between the relay station device and the communication terminal device.

6. A communication control method of a base station device that communicates with a communication terminal device via a relay station device, the relay station device being located in a shielded space and performing a downstream communication with the communication terminal device located in the shielded space concurrently with an upstream communication with the base station device, the communication control method comprising:

allocating one or more resources to be used in a communication between the relay station device and the base station device or a communication between another relay station device and the base station device;

storing a reuse requirement, which is set based on a radio wave shielding ability of the shielded space, the reuse requirement indicating a requirement for the one or more resources that can be reused in the downstream communication between the relay station device and the communication terminal device;

acquiring information of the relay station device, which includes the radio wave shielding ability of the shielded space;

specifying, from the allocated one or more resources, one or more reuse resources that are reusable for a communication between the relay station device and the communication terminal device when radio wave shielding abilities of the one or more reuse resources satisfy a reuse requirement, the reuse requirement being set with reference to a radio wave shielding ability of the shielded space and indicating a requirement for the one or more resources that can be reused in the downstream communication between the relay station device and the communication terminal device, the shielded space is defined by a radio wave shielding structure and radio waves from the base station device are attenuated within the shielded space compared with radio waves outside of the shielded space, the relay station device is attached to the radio wave shielding structure such that an upstream antenna of the relay station device performing the upstream communication with the base station device is located outside the radio wave shielding structure and a downstream antenna of the relay station device performing the downstream communication with the communication terminal device is located inside the radio wave shielding structure; and transmitting the specified one or more reuse resources from the base station device to the relay station device.

7. A communication control program product stored in a computer-readable non-transitory storage medium of a base station device that communicates with a communication terminal device via a relay station device, the relay station device being located in a shielded space and performing a downstream communication with the communication terminal device located in the shielded space concurrently with an upstream communication with the base station device, the communication control program comprising instructions to be executed by a processor of the base station device and the instructions comprising:

allocating one or more resources to be used in a communication between the relay station device and the base station device or a communication between another relay station device and the base station device;

storing a reuse requirement, which is set based on a radio wave shielding ability of the shielded space, the reuse requirement indicating a requirement for the one or more resources that can be reused in the downstream communication between the relay station device and the communication terminal device;

acquiring information of the relay station device, which includes the radio wave shielding ability of the shielded space;

specifying, from the allocated one or more resources, one or more reuse resources that are reusable for a communication between the relay station device and the communication terminal device when radio wave shielding abilities of the one or more reuse resources satisfy a reuse requirement, the reuse requirement being set with reference to a radio wave shielding ability of the shielded space and indicating a requirement for the one or more resources that can be reused in the downstream communication between the relay station device and the communication terminal device, the shielded space is defined by a radio wave shielding structure and radio waves from the base station device are attenuated within the shielded space compared with radio waves outside of the shielded space, the relay station device is attached to the radio wave shielding structure such that an upstream antenna of the relay station device performing the upstream communication with the base station device is located outside the radio wave shielding structure and a downstream antenna of the relay station device performing the downstream communication with the communication terminal device is located inside the radio wave shielding structure; and transmitting the specified one or more reuse resources from the base station device to the relay station device.

8. A communication control method of a relay station device, the relay station device being located in a shielded space and performing a downstream communication with a communication terminal device located in the shielded space concurrently with an upstream communication with a base station device, the communication control method comprising:

transmitting a radio wave shielding ability of the shielded space to the base station device;

acquiring, from the base station device, one or more reuse resources that satisfy a reuse requirement, the shielded space is defined by a radio wave shielding structure and radio waves from the base station device are attenuated within the shielded space compared with radio waves outside of the shielded space, the relay station device is attached to the radio wave shielding structure such that an upstream antenna of the relay station device performing the upstream communication with the base station device is located outside the radio wave shielding structure and a downstream antenna of the relay station device performing the downstream communication with the communication terminal device is located inside the radio wave shielding structure, the one or more reuse resources being specified from one or more resources that have been allocated for a communication between the relay station device and the base station device or a communication between another relay station device and the base station device when radio wave shielding abilities of the one or more reuse resources satisfy the reuse requirement; and allocating the one or more reuse resources to a communication between the relay station device and the communication terminal device, wherein the reuse requirement indicates a requirement for the one or more resources that can be reused in the downstream communication between the relay station device and the communication terminal device.

9. A communication control program stored in a computer-readable non-transitory storage medium of a relay station device, which is located in a shielded space and performs a downstream communication with a communication terminal device located in the shielded space concurrently with an upstream communication with a base station device, the communication control program comprising instructions to be executed by a processor of the relay station device and the instructions comprising:

transmitting a radio wave shielding ability of the shielded space to the base station device;

acquiring, from the base station device, one or more reuse resources that satisfy a reuse requirement, the shielded space is defined by a radio wave shielding structure and radio waves from the base station device are attenuated within the shielded space compared with radio waves outside of the shielded space, the relay station device is attached to the radio wave shielding structure such that an upstream antenna of the relay station device performing the upstream communication with the base station device is located outside the radio wave shielding structure and a downstream antenna of the relay station device performing the downstream communication with the communication terminal device is located inside the radio wave shielding structure, the one or more reuse resources being specified from one or more resources that have been allocated for a communication between the relay station device and the base station device or a communication between another relay station device and the base station device when radio wave shielding abilities of the one or more reuse resources satisfy the reuse requirement; and allocating the one or more reuse resources to a communication between the relay station device and the communication terminal device, wherein the reuse requirement indicates a requirement for the one or more resources that can be reused in the downstream communication between the relay station device and the communication terminal device.

10. The base station device according to claim 1, wherein the upstream antenna and the downstream antenna of the relay station device are connected to a wireless communication unit of the relay station device via a circuit.

11. The relay station device according to claim 5, wherein the upstream antenna and the downstream antenna of the relay station device are connected to a wireless communication unit of the relay station device via a circuit.

* * * * *